No. 726,195. PATENTED APR. 21, 1903.
G. J. SENGBUSCH.
INK WELL.
APPLICATION FILED DEC. 31, 1902.

NO MODEL.

Witnesses
Harry L. Ames
Herbert D. Lawson

Inventor
Gustav J. Sengbusch,
By Victor J. Evans
Attorney

UNITED STATES PATENT OFFICE.

GUSTAV J. SENGBUSCH, OF MILWAUKEE, WISCONSIN.

INK-WELL.

SPECIFICATION forming part of Letters Patent No. 726,195, dated April 21, 1903.

Application filed December 31, 1902. Serial No. 137,311. (No model.)

*To all whom it may concern:*

Be it known that I, GUSTAV J. SENGBUSCH, a citizen of the United States, residing at Milwaukee, in the county of Milwaukee and State of Wisconsin, have invented new and useful Improvements in Ink-Wells, of which the following is a specification.

My invention relates to new and useful improvements in ink wells or holders, and relates more particularly to devices of this character having automatic means for supplying ink to a pen when the same is inserted thereinto.

The invention is an improvement upon that shown and described by me in an application filed November 1, 1902, Serial No. 129,732; and its object is to simplify the construction of the well, whereby the same may be more readily manufactured and be rendered less expensive.

A further object of the invention is to provide a float feed controller and stopper which prevents the admission of dirt or dust to the ink-holder and obviates the evaporation of ink contained within the device.

The invention consists in the novel construction and arrangement of the several parts, which will be more fully hereinafter described and claimed.

Figure 1:
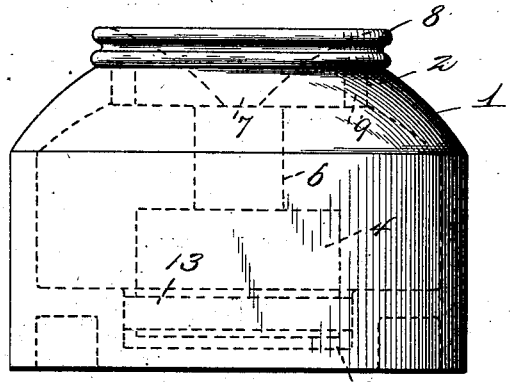
Figure 2:
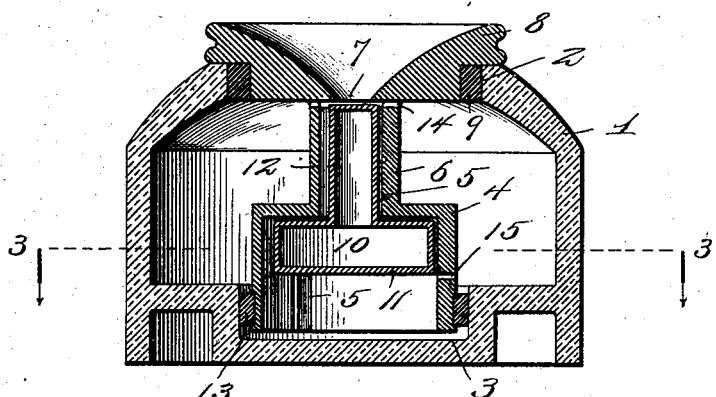
Figure 3:
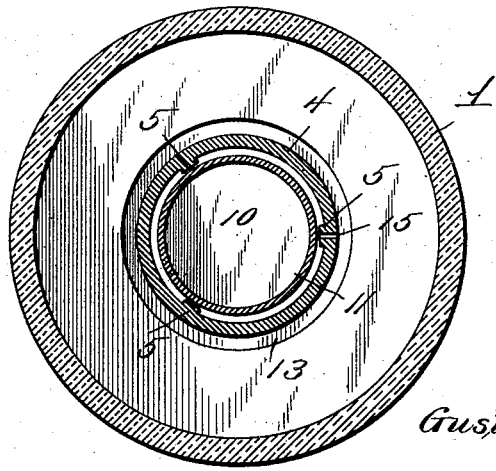

In the drawings, Figure 1 is a side elevation of my improved ink-well and showing in dotted lines the interior portions thereof. Fig. 2 is a central vertical section therethrough, and Fig. 3 is a section on line 3 3 of Fig. 2.

Referring to the figures by numerals of reference, 1 is a receptacle, preferably formed of glass and having a large aperture 2 at the top thereof, while a recess 3 is formed at the center of the bottom of said receptacle. This recess is adapted to receive the lower end of a cylindrical casing 4, having vertical ribs 5 therein and open at its lower end. From the upper end of this casing projects a neck 6, the open end of which registers with the inlet 7, formed within the cap 8 of the ink-well. This cap fits within the opening 2, before referred to, and is preferably held securely therein by a washer 9 of suitable material. Vertical ribs 5 are also formed within the neck 6, and these ribs, as well as the ribs in casing 4, serve to guide a float 10, arranged within the casing 4 and neck 6. This float is preferably formed of hard rubber and comprises a cylindrical body 11 and a stem 12, extending upward therefrom and adapted to move vertically upon the ribs within neck 6. A gasket 13 is interposed between the casing 4 and the side of recess 3 and serves to retain said casing in proper position within receptacle 1 and also prevents the escape of the contents of the casing at points between it and the walls of recess 3. Air-inlets 14 are formed within the upper end of neck 6, and a vent 15 is arranged within one side of casing 4 at a point in horizontal alinement with the lower surface of float 10 when said float is in its normal or raised position.

When the ink-well is to be used, the cap 8 is removed and ink poured into the receptacle 1. It will flow from the same through the vent 15 into casing 4 and the air will be forced outward thereby between the ribs 5. As the receptacle 1 and casing 4 fill, float 10 will be carried upward until the top of body 11 thereof contacts with the upper end of casing 4, when the upward progress of the contents of the ink-well through the casing 4 and its neck 6 is prevented. When a pen is pressed into contact with the upper end of stem 12, the body 11 of the float is moved downward with said stem, and as the vent 15 is arranged within one of ribs 5 it will be promptly closed and the ink within casing 4 will be forced upward between ribs 5 and over the top of stem 12. When the float is released, it will by reason of its buoyancy return to its normal position and that portion of ink which has been withdrawn from casing 4 will be promptly replaced by a portion of the ink outside of the casing, the same passing through the vent 15 as soon as the same is opened. The air-inlets 14 prevent the formation of a vacuum.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus described the invention, what is claimed as new is—

1. In an ink-well, the combination with a receptacle having a recess in the bottom thereof; of a casing having an inlet and open at its lower end, means for supporting said end of the casing within the recess in the receptacle, guide-ribs within the casing, and a float arranged within the casing and between the ribs and adapted when depressed to close the inlet to the casing.

2. In an ink-well, the combination with a receptacle having a recess in the bottom thereof; of a casing having an inlet thereto and having its lower end open, means for supporting and sealing the casing within the recess, a neck communicating with the casing, ribs within said casing and neck, a float within the casing and neck and adapted to bear upon the ribs therein, said float being adapted when depressed to close the inlet to the casing, and air-inlets in the neck and opening into the receptacle.

3. In an ink-well, the combination with a receptacle having an inlet thereto and a recess in the bottom thereof; of a casing having its lower end open, means for securing and sealing said end of the casing within the recess, a neck upon the casing having inlets communicating with the interior of the receptacle, ribs within the casing and neck, a float within said casing and neck adapted to bear upon the ribs, and an inlet through one of the ribs in the casing and communicating with the interior of the receptacle, said inlet being adapted to be closed when the float is depressed.

In testimony whereof I affix my signature in presence of two witnesses.

GUSTAV J. SENGBUSCH.

Witnesses:
A. G. SEMMANN,
JOHN G. PLISCHKE.